United States Patent
Sternowski

(10) Patent No.: US 6,169,278 B1
(45) Date of Patent: Jan. 2, 2001

(54) DIELECTRIC HEATING USING SPREAD-SPECTRUM ENERGY

(75) Inventor: Robert H. Sternowski, Cedar Rapids, IA (US)

(73) Assignee: Rockwell Collins, Inc., Cedar Rapids, IA (US)

( * ) Notice: Under 35 U.S.C. 154(b), the term of this patent shall be extended for 0 days.

(21) Appl. No.: 09/273,124

(22) Filed: Mar. 19, 1999

(51) Int. Cl.[7] .................................... H05B 6/48
(52) U.S. Cl. ............................ 219/778; 219/770
(58) Field of Search ........................... 219/770–780, 219/764, 767; 34/255; 166/248

(56) References Cited

U.S. PATENT DOCUMENTS

| | | | |
|---|---|---|---|
| 3,652,816 | * 3/1972 | Preston | 219/773 |
| 4,241,447 | * 12/1980 | Epstein | 375/150 |
| 4,457,365 | 7/1984 | Kasevich et al. | 166/60 |
| 4,531,038 | * 7/1985 | Lillibridge et al. | 219/779 |
| 4,670,634 | 6/1987 | Bridges et al. | 219/10.41 |
| 4,973,811 | 11/1990 | Bass | 219/10.57 |
| 5,114,497 | 5/1992 | Johnson et al. | 134/21 |
| 5,152,341 | 10/1992 | Kasevich | 166/248 |
| 5,182,134 | * 1/1993 | Sato | 427/543 |
| 5,484,985 | * 1/1996 | Edelstein et al. | 219/772 |
| 5,982,813 | * 11/1999 | Dutta et al. | 375/219 |

OTHER PUBLICATIONS

Application Ser. No. 08/906,061, Filed Aug. 5, 1997, Entitled "Efficient Dielectrically Heatable Compound And Method" R. H. Sternowski.

Application Ser. No. 08/906,414, Filed Aug. 5, 1997, Entitled "Efficient Dielectric Heater" R. H. Sternowski.

* cited by examiner

Primary Examiner—Teresa Walberg
Assistant Examiner—Quang Van
(74) Attorney, Agent, or Firm—Nathan O. Jensen; Kyle Eppele; J. P. O'Shaughnessy

(57) ABSTRACT

A dielectric heater for subject material by connecting an RF source, modulated to produce a spread-spectrum signal to a radio frequency applicator for the subject material, without requiring an impedance matching network. The carrier frequency of the RF source may be selected to match the impedance of the subject material and applicator network.

10 Claims, 1 Drawing Sheet

DIELECTRIC HEATING USING SPREAD-SPECTRUM ENERGY

BACKGROUND

This invention relates to soil decontamination using dielectric heating. Specifically, the invention involves spread-spectrum radio energy to achieve dielectric heating.

It has been known to use radio-frequency energy ("RF energy") to heat dielectric substances. For example, RF energy has been used to heat thermosetting resins during molding processes. See, for example, U.S. patent application Ser. Nos. 08/906,414 and 08/906,061 which are incorporated by reference. Also, RF energy may be used to heat undisturbed soil for purposes of decontaminating the soil. Using RF energy to heat soil may be referred to as "dielectric heating" of the soil. Dielectric heating of soil is known to remove many types of organic and hydrocarbon compounds from the soil. Steam "purging" of the soil's water content and pyrolization (heat induced molecular breakdown) of organic compounds are two mechanisms attributable to the heating which effect the decontamination.

Steam purging occurs when the water content of the soil is boiled off by the heating, and the contaminants are carried out of the soil by the steam. Steam purging requires only that the soil be heated to the boiling point of water. Pyrolization is the breakdown of molecular bonds in complex hydrocarbon contaminants, and, depending on the contaminant in question, requires the soil to be raised to a temperature from 100 to 250 degrees Celsius.

In many cases, in situ ("in place") heating of soil is preferred over conventional methods which disturb the soil. Methods which require the soil to be disturbed, such as moving the soil to an incinerator and then replacing it, are expensive, time consuming, and may encounter additional regulatory hurdles, when compared to in situ heating. However, known methods of in situ soil heating require expensive, high-powered RF signal generators and impedance matching networks.

For example, one known attempt to dielectrically heat soil in situ applies RF energy to the soil. Three parallel, linear rows of electrodes are driven into the soil. The center row is connected through an impedance matching network to a High Frequency ("HF") transmitter. The two outer rows are a ground counterpoise to the center row. It is believed that HF transmitters of more than 100 kW are used. The high-power transmitter, and associated impedance matching network, are expensive, and reduce the economic advantages of in situ decontamination. Similarly, radio frequency molding often requires high power transmitters and impedance matching networks.

In addition to the expense of high-powered transmitters, regulations relating to emissions of radio frequency signals limit the use of high-powered transmitters to a limited number of predetermined frequencies, eg., 6.78 MHz, 13.56 MHz, or 27.15 MHz. The use of other frequencies is not feasible because the high power levels required often lead to leakage of RF energy in excess of levels permitted by the FCC. The limitation to predetermined frequencies is disadvantageous because the predetermined frequencies may not be optimal, or even suitable, for heating certain materials or a particular thickness of a material. For example, the dielectric constant of materials such as soil or a thermosetting resin varies with the frequency that is applied to the subject material. Also, for any given frequency, various subject materials are likely to have various different dielectric constants. For example, the impedance of an electrode-and-soil network, as known in the prior art, has been observed to vary depending on the frequency to which the RF source is tuned and with the actual soil itself. Thus, the impedance matching network, coupling the RF source to the electrode-and-soil network, is essential to efficient power transmission to the soil. Moreover, the limited number of frequencies available for dielectric heating of soil may make it difficult to adequately match the RF source to the electrode-and-soil network.

SUMMARY

The present invention provides for dielectric heating of subject material by connecting an RF source, modulated to produce a spread-spectrum signal to a radio frequency applicator for the subject material, without requiring an impedance matching network. The carrier frequency of the RF source may be selected to match the impedance of the subject material and applicator network.

DETAILED DESCRIPTION

Figure 1:
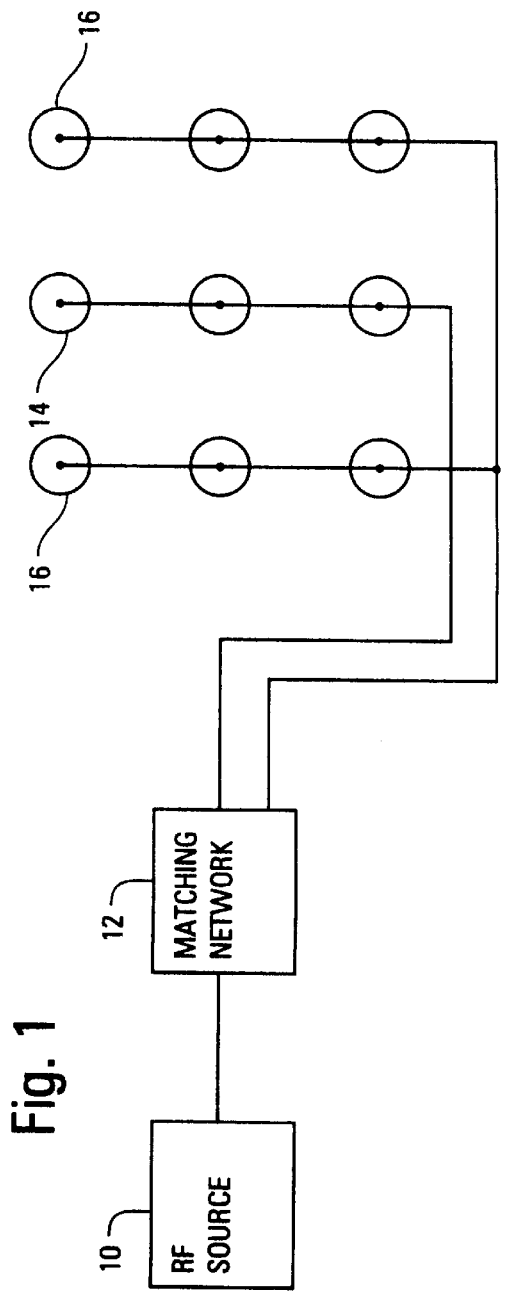
FIG. 1 shows a block diagram of a prior art dielectric heater for in situ soil decontamination.

FIG. 1 shows one known apparatus for dielectrically heating contaminated soil in situ. A high power RF source 10 is connected to a first terminal of an impedance matching network 12. The RF source 10 outputs a fixed-frequency, "zero bandwidth" RF signal at power levels which may exceed 100 kW. The impedance matching network 12 must be capable of transferring the 100 kW RF signal. A second terminal of the impedance matching network 12 is connected to a center row of electrodes 14 and two outer rows of electrodes 16. The electrodes are driven into contaminated soil. The high-powered RF source 10 is tuned to one of the few frequencies permitted by regulations of the Federal Communications Commission ("FCC"). The impedance matching network 12 is tuned to match the impedance of the RF source 10 to the impedance of the electrodes driven into the soil. The impedance of the electrodes driven into the soil is proportional to the dielectric constant of the soil for the frequency at which the RF source 10 is tuned.

Figure 2:
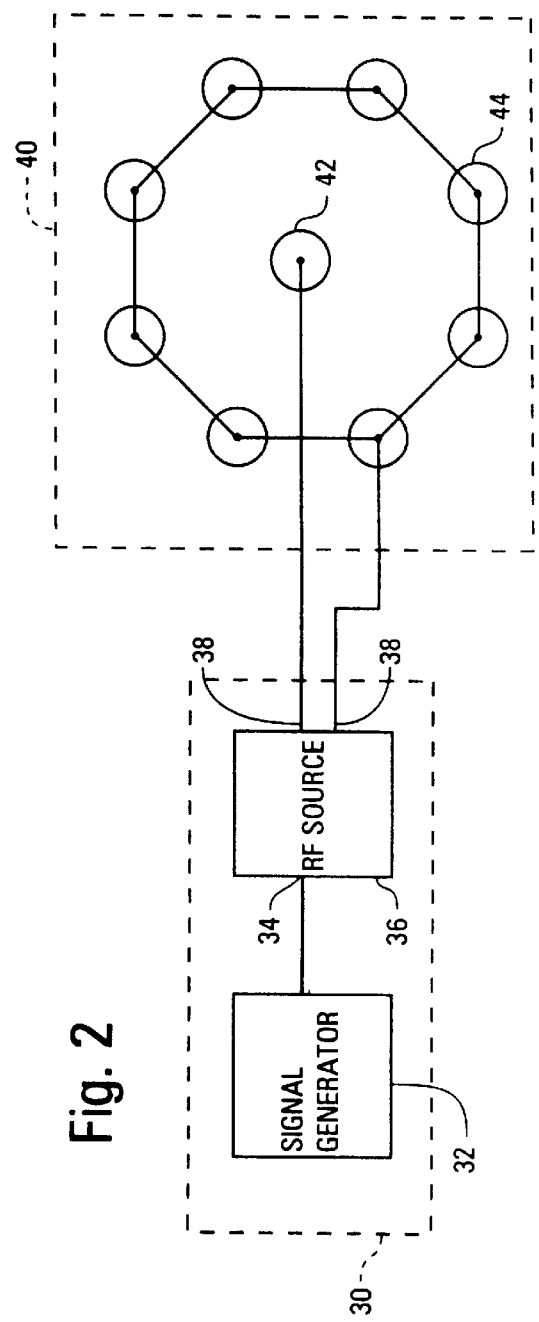
FIG. 2 shows a block diagram of one embodiment of the present invention relating to in situ soil decontamination.

Referring now to FIG. 2, one exemplary embodiment of the present invention is illustrated. A spread-spectrum dielectric heater 30 comprises a digital signal generator 32 connected to the low-level RF input 34 of an RF source 36. The digital signal generator 32 outputs a digital signal. One type of appropriate digital signal generator generates a BPSK (Binary Phase Shift Keying) random digital signal. However, other patterned, random, or pseudo-random digital signals are known and may be acceptable. Also, the invention is not limited to spread spectrum generators using digital signal generators. Rather, any spread spectrum modulation method known to those skilled in the art may be used. For example, analog signal generators are contemplated as acceptable signal generators for use in the present invention.

The RF source 36 has RF output 38 which outputs an amplified spread spectrum RF signal. The RF signal in this example comprises a carrier signal modulated with the signal produced by the signal generator 32. In the illustrated example of FIG. 2, the bandwidth of the digital-modulated RF signal is twice the data rate of the digital signal. However, the invention is not limited to twice-bandwidth modulation techniques. The data rate of the digital signal may be selected so that the bandwidth of the digitally-modulated RF signal is within the operational bandwidth of the RF source. There may be RF energy beyond the first nulls. That is, the data rate for the digital signal may be selected to be one-half or less of the operational bandwidth of the RF source.

The spread spectrum RF signal is connected to a RF applicator 40. In one embodiment, illustrated in FIG. 2, the RF applicator includes a signal electrode 42 and a plurality of ground electrodes 44. As an example, five-eighth inch, cooper-clad steel rods are suitable stock for the electrodes. In the illustrated embodiment, exemplary electrodes may be eight feet long and driven approximately six feet into the soil. The signal electrode 42 in this example may be driven into the soil near the center of the area to be dielectrically heated. A plurality of ground electrodes 44 in the illustrated embodiment are driven into the ground surrounding the signal electrode. The exact size, depth, composition, shape and pattern of signal and ground electrodes is not essential to the practicing of the present invention, and many alternative electrode structures known to those skilled in the art are suitable. The ground electrodes in the illustrated embodiment are connected to each other and to the common terminal of the RF source.

The steam and other vapors produced during in situ soil decontamination are typically collected and subjected to further processing. Suitable apparatus for vapor collection are known and described, for example, in U.S. Pat. No. 4,670,634, which is hereby incorporated by reference. Vapor collection apparatus may also provide a safety barrier and RF shielding for the spread-spectrum RF signal.

In another example, the RF applicator comprises a plurality of parallel plate electrodes in the shape of a mold. Thermo-setting resin is injected into the parallel plate mold, and dielectrically heated by the spread spectrum RF signal.

In operation, the spread spectrum RF signal spreads the RF energy across a broad spectrum of frequencies. The "spread" in the illustrated examples is determined by the data rate of the digital signal source and is centered around the carrier frequency of the RF source. A wide "spread" is advantageous for several reasons. For example, the depth of penetration of the subject material of a RF signal is inversely related to the frequency of the applied RF signal. A zero bandwidth, fixed frequency signal, therefore, has a relatively fixed depth of penetration. A spread-spectrum RF signal, on the contrary, is a composite of many frequencies, thereby varying the depth of penetration over a wider region during the heating process. In other words, spread-spectrum RF signals promote more even heating of the subject material than the fixed frequency signals previously known.

Also, a spread-spectrum RF signal spreads the RF energy across the bandwidth of the modulated RF signal. Thus, for any given portion of the bandwidth of the modulated RF signal, the RF energy is low. Consequently, RF energy leaked from the decontamination site is within regulatory limits for unlicensed users, allowing legal use of the entire radio-frequency spectrum, rather than the few, preselected frequencies allowed by the FCC. Therefore, the carrier frequency and modulating bandwidth may be legally optimized for a particular application, without regulatory constraint.

Also, because the carrier frequency is not limited to pre-selected, regulated frequencies, a carrier frequency may be selected to match the RF source to the particular application at hand without a conventional impedance matching network. For example, typical RF sources have a nominal impedance of approximately 50 ohms. Also, it has been observed that an electrode and soil network may also have an impedance of 50 ohms, but only at a certain frequency or frequencies (hereinafter "matched impedance frequency"). When the RF source operates on a carrier frequency that corresponds with the matched impedance frequency, the RF source impedance is matched with the electrode and soil network, and no additional impedance matching network is needed. Typically, however, the impedance of a RF source may tuned over a limited range about their nominal impedance, and maximum efficiency is achieved when the impedance of the RF source is fine-tuned to the impedance of the electrode and soil network.

Similarly, in RF molding processes, a given parallel plate capacitor mold will have a nominal impedance. Because the nominal impedance is proportional to the area of the parallel plate capacitor and the thickness of the molded component, it may be difficult to achieve a nominal impedance sufficiently close to the nominal impedance of the RF source in some specific applications.

Additionally, it has been observed that the impedance of an electrode and soil network varies as the soil is dielectrically heated, resulting in a matched impedance frequency that rises in-step with soil temperatures. Once again, because the leakage energy from the spread spectrum RF signal remains within regulatory guidelines in another embodiment, the carrier frequency of the RF source may be continuously varied to maintain a matched impedance frequency, rather than varying the tuning of a large impedance matching network as is done by known fixed-frequency systems.

In addition to the forgoing advantages, it has been observed that relatively low-power RF signals are effective when modulated in accordance with the present invention. For example, commercially available RF sources having a power output of 10 kW, such as a FRT-96 10 kW HF transmitted, provides sufficient RF energy to achieve soil decontamination.

Specific embodiments of spread-spectrum dielectric heating method and apparatus have been described herein for purposes of illustrating the manner in which the invention may be made and used. It should be understood that implementation of other variations and modifications of the invention in its various aspects will be apparent to those skilled in the art, and that the invention is not limited thereto by the specific embodiments described. It is therefore contemplated to cover by the present invention any and all modifications, variations or equivalence that fall within the true spirit and scope of the basic underlying principles disclosed and claimed herein.

What is claimed is:

1. A system for removing soil contaminants, comprising:
   (a) a modulation signal generator that generates a low level radio frequency signal;
   (b) a radio-frequency source, electrically coupled to the low-level radio-frequency signal, said radio-frequency source having as its output, a spread spectrum carrier signal representative of a predetermined proportion to the low-level radio-frequency signal;
   (c) a radio-frequency applicator for in situ heating of soil having a plurality of ground electrodes each coupled to a first terminal of the radio-frequency source and a signal electrode coupled to a second terminal of the radio frequency source; and
   (d) a vapor collection apparatus incorporated into the radio-frequency applicator;

wherein the spread spectrum radio frequency signal enables the modulation signal bandwidth and energy leakage is within current unregulated parameters.

2. The system for removing soil contaminants of claim 1, wherein the radio frequency applicator comprises a parallel plate mold.

3. The system for removing soil contaminants of claim 1, wherein the modulation signal generator comprises an analog signal generator.

4. The system for removing soil contaminants of claim 1, wherein the modulation signal generator comprises a digital signal generator.

5. The system for removing soil contaminants of claim 1, wherein the radio-frequency source has an operational bandwidth, and the modulation signal generator comprises a digital signal generator having a data rate no higher than approximately one-half the operational bandwidth of the radio-frequency source.

6. A method for decontaminating, in situ, a predetermined area of ground, comprising the steps of:
   (a) generating a modulation signal;
   (b) applying the modulation signal to a radio-frequency input of an radio-frequency transmitter;
   (c) applying an output of the radio-frequency transmitter to a radio frequency applicator having a plurality of around electrodes and a signal electrode for decontaminating the subject material, without the use of a high power transmitter and associated impedance matching network.

7. The method of claim 6, wherein the modulation signal is digital, further comprising the step of setting a data rate of the modulation signal to a rate no higher than approximately one-half an operational bandwidth of the radio-frequency transmitter.

8. The method of claim 6 further comprising the steps of:
   (a) determining an impedance-matched frequency at which applicator has an impedance approximately equal to the radio frequency transmitter, and
   (b) setting a carrier signal of the radio-frequency transmitter to the impedance-matched frequency.

9. The method of claim 8, wherein the steps of determining the impedance matched frequency and setting the carrier signal are repeated as the soil is heated.

10. The method of claim 8, further comprising the step of tuning the impedance of the radio-frequency transmitter to the impedance of the electrodes.

* * * * *